(12) United States Patent
Singhal et al.

(10) Patent No.: US 12,217,753 B2
(45) Date of Patent: Feb. 4, 2025

(54) SYSTEM(S) AND METHOD(S) FOR ENFORCING CONSISTENCY OF VALUE(S) AND UNIT(S) IN A VEHICULAR ENVIRONMENT

(71) Applicant: GOOGLE LLC, Mountain View, CA (US)

(72) Inventors: Amit Singhal, Sunnyvale, CA (US); Jordan Jozwiak, Belmont, CA (US)

(73) Assignee: GOOGLE LLC, Mountain View, CA (US)

( * ) Notice: Subject to any disclaimer, the term of this patent is extended or adjusted under 35 U.S.C. 154(b) by 415 days.

(21) Appl. No.: 17/853,014

(22) Filed: Jun. 29, 2022

(65) Prior Publication Data

US 2024/0005920 A1 Jan. 4, 2024

(51) Int. Cl.
*G10L 15/22* (2006.01)
*B60W 40/09* (2012.01)
*G06F 40/279* (2020.01)

(52) U.S. Cl.
CPC .......... *G10L 15/22* (2013.01); *B60W 40/09* (2013.01); *G06F 40/279* (2020.01); *B60W 2540/21* (2020.02); *G10L 2015/223* (2013.01)

(58) Field of Classification Search
CPC ... B60W 40/09; B60W 2540/21; G10L 15/22; G10L 2015/223; G06F 40/279
See application file for complete search history.

(56) References Cited

U.S. PATENT DOCUMENTS

| | | | |
|---|---|---|---|
| 11,367,524 B1* | 6/2022 | Bhurani | A61B 90/98 |
| 2002/0133571 A1* | 9/2002 | Jacob | G06Q 30/0256 |
| | | | 709/219 |
| 2007/0078658 A1* | 4/2007 | Virji | G10L 15/26 |
| | | | 704/E15.045 |
| 2012/0035924 A1* | 2/2012 | Jitkoff | G01C 21/3608 |
| | | | 704/235 |
| 2013/0325474 A1* | 12/2013 | Levien | G10L 15/065 |
| | | | 704/E15.005 |
| 2018/0126986 A1* | 5/2018 | Kim | B60W 30/146 |
| 2019/0317735 A1* | 10/2019 | Duan | G06F 8/34 |
| 2020/0342876 A1* | 10/2020 | Woike | G10L 13/04 |
| 2020/0356339 A1* | 11/2020 | Krishnan | G06F 9/54 |
| 2023/0206915 A1* | 6/2023 | Mohajer | G10L 15/22 |
| | | | 704/251 |

* cited by examiner

*Primary Examiner* — Eric Yen
(74) *Attorney, Agent, or Firm* — Gray Ice Higdon

(57) ABSTRACT

Implementations described herein relate to determining how an automated assistant should respond to a given spoken utterance received in a vehicular environment to enforce consistency between value(s) and/or unit(s) that are displayed at a given display device of an in-vehicle computing device and value(s) and/or unit(s) that are utilized in executing a given vehicular command or that are provided for presentation to a user in response to a given vehicular request. For example, implementations can receive the given spoken utterance, identify the given vehicular command/request based on processing the given spoken utterance, and determine an original equipment manufacturer (OEM) query based on the given vehicular command/request included in the spoken utterance, and transmit the OEM query to a given OEM component. Further, implementations can determine how the automated assistant should respond to the given spoken utterance based on responsive content that is received from the given OEM component.

20 Claims, 4 Drawing Sheets

SYSTEM(S) AND METHOD(S) FOR ENFORCING CONSISTENCY OF VALUE(S) AND UNIT(S) IN A VEHICULAR ENVIRONMENT

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide spoken natural language input (i.e., spoken utterances) directed to an automated assistant, which may in some cases be converted into text and then processed, and/or by providing textual (e.g., typed) natural language input directed to an automated assistant. These spoken utterances and/or typed inputs often include assistant commands or requests directed to an automated assistant. An automated assistant generally responds to these assistant commands by providing responsive user interface output(s) (e.g., audible and/or visual user interface output), controlling various device(s), and/or performing other action(s).

These automated assistants typically rely upon a pipeline of components in interpreting and responding to these spoken utterances and/or typed inputs. For example, an automatic speech recognition (ASR) engine can process audio data that correspond to a spoken utterance of a user to generate ASR output, such as a transcription (i.e., sequence of term(s) and/or other token(s)) of the spoken utterance. Further, a natural language understanding (NLU) engine can process the ASR output (or typed inputs) to generate NLU output, such as an intent of the user in providing the spoken utterance and optionally slot value(s) for parameter(s) associated with the intent. Moreover, a fulfillment engine can be used to process the NLU output, and to obtain fulfillment output, such as the responsive user interface output(s), the responsive smart device control commands(s), and/or other responsive action(s). However, in some cases, these automated assistants may fulfill certain spoken utterances in certain manners that are inconsistent with other system(s), thereby creating user confusion or otherwise detracting from the user experience.

For example, assume that an automated assistant is executing at least in part at an in-vehicle computing device of a vehicle of a given user, and assume that the user directs a given spoken utterance of "set the temperature to 71 degrees" to the automated assistant to alter a state of a blower of the vehicle. In this example, the automated assistant can utilize the aforementioned pipeline of components to determine to alter the state of the blower of the vehicle to a target value of "71 degrees" and provide audible output of "I set the blower to 71 degrees" in response to receiving the given spoken utterance. However, assume that a display component of the in-vehicle computing device that is associated with the blower only displays even values for the blower. Notably, in this example, the display component of the in-vehicle computing device may be updated to "70 degrees" or "72 degrees", which is inconsistent with the target value of "71 degrees" that was included in the given spoken utterance and is inconsistent with the audible output provided for presentation to the user. Even though the blower may, in fact, be set to "71 degrees", this inconsistency with the given spoken utterance in terms of both how the automated assistant responded (e.g., "I set the blower to 71 degrees") and what is displayed (e.g., "70 degrees" or "72 degrees" instead of "71 degrees"), creates user confusion or otherwise detracts from the user experience. These inconsistencies may be exacerbated when different manufacturers of different vehicles use different, non-standard conversion formulas on the back-end in satisfying the given spoken utterance.

As another example, assume that an automated assistant is executing at least in part at an in-vehicle computing device of a vehicle of a given user, and assume that the user directs a given spoken utterance of "what's my range" to the automated assistant to ascertain how much further the user can go based on a current level of a power source of the vehicle. In this example, the automated assistant can utilize the aforementioned pipeline of components to determine to obtain a current value for a range of the vehicle (e.g., "108 miles") and provide audible output of "your current range is 108 miles" in response to receiving the given spoken utterance. However, assume that a display component of the in-vehicle computing device that is associated with the range of the vehicle rounds to the nearest $10^{th}$ mile. Notably, in this example, the display component of the in-vehicle computing device may be indicate a range of "110 miles" (e.g., based on "108 miles" being rounded up to the nearest $10^{th}$ mile), which is inconsistent with the current value of "108 miles" that was included in the audible output provided for presentation to the user. Accordingly, this inconsistency with the how the automated assistant responded (e.g., "your current range is 108 miles") and what is displayed (e.g., "110 miles" instead of "108 miles") may create user confusion or otherwise detracts from the user experience.

In these examples, not only do these inconsistencies create user confusion or otherwise detract from the user experience, but the user may engage in additional dialog with the automated assistant in an attempt to obviate this confusion, thereby further detracting from the user experience and requiring further user inputs at the in-vehicle computing device. As a result, computational resources may be unnecessarily consumed by the automated assistant and/or the in-vehicle computing device when the user further engages in these additional dialogs. Accordingly, there is a need in the art for techniques to enforce consistency of value(s) and/or unit(s) of these value(s) across different sources of data to mitigate and/or eliminate instances of these inconsistencies.

SUMMARY

Implementations described herein relate to determining how an automated assistant should respond to a given spoken utterance received in a vehicular environment to enforce consistency between value(s) and/or unit(s) that are displayed at a given display device of an in-vehicle computing device, and value(s) and/or unit(s) that are utilized in executing a given vehicular command or that are provided for presentation to a user in response to a given vehicular request. For example, implementations can receive the given spoken utterance, identify the given vehicular command/request based on processing the given spoken utterance, and determine an original equipment manufacturer (OEM) query based on the given vehicular command/request included in the spoken utterance, and transmit the OEM query to a given OEM component. Further, implementations can determine how the automated assistant should respond to the given spoken utterance based on responsive content that is received from the given OEM component. In these and other manners, implementations described herein can dynamically adapt how the automated assistant responds to the given spoken utterance to enforce consistency between these value(s) and/or unit(s) to mitigate and/or eliminate instances of these inconsistencies.

For instance, assume that a user located in a vehicle directs a given spoken utterance of "set the temperature to 71 degrees" to an automated assistant to alter a state of a blower of the vehicle. In this instance, a given vehicular command that is included in the given spoken utterance and that includes at least a target value for a vehicular device of the vehicle may be identified based on processing the given spoken utterance. In particular, audio data capturing the given spoken utterance may be processed, using an automatic speech recognition (ASR) model, to generate ASR output, such as recognized text corresponding to the given spoken utterance. Further, the ASR output may be processed, using a natural language understanding (NLU) model, to generate NLU output, such as an intent of the user in providing the spoken utterance (e.g., an intent of altering the state of the blower of the vehicle) and a slot value (e.g., "71 degrees") for a parameter (e.g., temperature parameter). In this instance, the given vehicular command associated with altering the state of the blower of the vehicle to the target value of "71 degrees" may be identified.

Further, a given OEM query may be determined based on the given vehicular command. In this instance, the OEM query may be a structured request, and may include an indication of the vehicular device (e.g., the blower of the vehicle identified based on the vehicular request), a current unit for a current value of the vehicular device, the target value for the vehicular device, and/or a target unit for the vehicular device. In particular, the current unit for the current value may be determined from various data sources of the vehicle, such as a display value and/or display unit from a display associated with the blower of the vehicle, a stored vehicle value and/or a stored vehicle unit from on-device storage of an in-vehicle computing device of the vehicle, a stored assistant value and/or a stored assistant unit from assistant storage of the in-vehicle computing device of the vehicle or another computing device, or a controller value and/or controller unit from a controller area network (CAN) bus of the vehicle. Further, the target unit for the vehicular device may be determined based on, for example, being explicitly included in the given spoken utterance (e.g., the user specifying "71 degrees Fahrenheit"), being inferred based on the given spoken utterance (e.g., the blower of the vehicle being unable to be set to "71 degrees Celsius") and/or based on a current unit for the current value, and/or using other techniques.

Moreover, the given OEM query may be transmitted to a given OEM component that is associated with an OEM of the vehicle via an application programming interface (API) of the in-vehicle computing device that enables the automated assistant to interact with the given OEM component. The transmitting of the given OEM query to the given OEM component via the API may cause the given OEM component to generate responsive content that indicates how the given OEM component would handle the given vehicular command. In some of these instances, the given OEM component may convert the target value in the target unit (e.g., "71 degrees Fahrenheit") to a different value in a different unit (e.g., "21.66 degrees Celsius") using a particular conversion formula (e.g., that may or may not be uniform across a plurality of disparate OEMs) since the given OEM component utilizes the different value in the different unit to cause the state of the vehicular device to be altered on the back-end, and then re-convert from the different value in the different unit and back to an expected value in the target unit to inform the automated assistant of an action that would be taken responsive to the given vehicular command. In some of these instances, the given OEM component may additionally, or alternatively, truncate the different value in the different unit (e.g., truncate "21.66 degrees Celsius" to "21 degrees Celsius") due to various hardware and/or software limitations to prevent certain levels of precision, which may exacerbate these inconsistencies in this converting and re-converting. Accordingly, in this instance, the responsive content received responsive to the transmitting of the given OEM query may indicate that an expected value indicates that the blower of the vehicle may be set to "70 degrees Fahrenheit", "71 degrees Fahrenheit", or "72 degrees Fahrenheit" based on the particular conversion formula utilized by the given OEM component and/or based on the truncating of these values by the given OEM component.

In this instance, further assume that the responsive content indicates that the expected value indicates that the blower of the vehicle will be set to either "70 degrees Fahrenheit" or "72 degrees Fahrenheit" based on the user providing the given spoken utterance. Notably, neither of the expected values of "70 degrees" or "72 degrees" match the target value that was included in the given spoken utterance (e.g., "71 degrees"). Nonetheless, in this instance, the automated assistant may cause the blower of the vehicle to be set to "70 degrees" or "72 degrees" (e.g., based on the responsive content), and alert the user that provided the spoken utterance of the temperature to which the blower was set due to limitations of the display associated with the blower. Put another way, the automated assistant may execute an alternative vehicular command (e.g., setting the blower to "70 degrees" or "72 degrees") in lieu of the given vehicular command included in the spoken utterance (e.g., setting the blower to "71 degrees"), thereby mitigating and/or eliminating instances of these inconsistencies. Further, in this instance, a display associated with the blower may be updated to reflect the altered state of the blower of the vehicle.

Notably, in this instance, the limitation of not being able set the temperature to "71 degrees" may be that the display associated with the blower only displays even values (e.g., "68 degrees", "70 degrees", "72 degrees", and so on) in a particular unit (e.g., "Fahrenheit"). As a result, the display associated with the blower may be updated to reflect a temperature of "70 degrees", "72 degrees", or an error message, while the automated assistant may provide other output (e.g., synthesized speech) that indicates the state of the blower was changed to a temperature of "71 degrees". Accordingly, the automated assistant may identify an alternative vehicular command (e.g., "set the temperature to 70 degrees", "set the temperature to 72 degrees", or the like) that includes an alternative target value (e.g., "70 degrees" or "72 degrees"), and cause the alternative vehicular command to be provided for presentation to the user, such as "your display only supports even values for temperatures, try saying 'set the temperature to 72 degrees'", to mitigate and/or eliminate instances of these inconsistencies. Additionally, or alternatively, the automated assistant may cause the alternative vehicular command to be executed without waiting for the user to repeat the alternative vehicular command, but still cause the alternative vehicular command (e.g., "set the temperature to 70 degrees", "set the temperature to 72 degrees", or the like) that includes the alternative target value (e.g., "70 degrees" or "72 degrees") to be provided for presentation to the user, and optionally along with an indication of why the automated assistant will not execute the given vehicular command (e.g., "your display only supports even numbered temperatures").

Accordingly, in these instances, implementations can determine whether to cause the automated assistant to perform the given vehicular command through interacting with the given OEM component and enforce consistency of these value(s) and/or unit(s) via the API, or determine whether to cause the automated assistant to provide, for presentation to the user, the alternative vehicular command through interacting with the given OEM component and enforce consistency of these value(s) and/or unit(s) via the API. Notably, through utilization of the API as described herein, the automated assistant need not maintain any database of different conversion tables or different conversion formulas utilized by different OEMs. As a result, the techniques described herein are robust to changes of these different conversion tables or different conversion formulas utilized by different OEMs, and are scalable to different vehicles manufactured by different OEMs.

In contrast, assume that the user located in the vehicle directs a given spoken utterance of "what's my range" to the automated assistant to identify an estimated distance the vehicle can travel before running out gas, battery power, etc. In this instance, a given vehicular request that is included in the given spoken utterance and that requests a current value (e.g., corresponding to a range of the vehicle, such as 110 miles) for a vehicular device of the vehicle may be identified based on processing the given spoken utterance in the same or similar manner described above (e.g., by performing ASR, NLU, etc.). Accordingly, in this instance, the given vehicular command associated with requesting the range of the vehicle may be identified based on the processing of the given spoken utterance.

Further, a given OEM query may be determined based on the given vehicular request. In this instance, the OEM query may be a structured request, and may include an indication of the vehicular device (e.g., a power system of the vehicle identified based on the vehicular request) and optionally a current unit for the current value. In particular, the current unit for the current value may be determined from various data sources of the vehicle, such as a display unit from a display associated with the power source of the vehicle, a stored unit from the on-device storage of the in-vehicle computing device of the vehicle, a stored assistant unit from assistant storage of the in-vehicle computing device of the vehicle or the another computing device, or a controller unit from the CAN bus of the vehicle.

Moreover, the given OEM query may be transmitted to a given OEM component that is associated with an OEM of the vehicle, such as via the API of the in-vehicle computing device described above. However, in this instance, the transmitting of the given OEM query to the given OEM component, via the API, may cause the given OEM component to generate responsive content that includes the current value for the vehicular device and/or an estimated current value for the vehicular device. In some of these instances, the given OEM component, and via the API, may read the current value from various data sources of the vehicle, such as a display value from the display associated with the power source of the vehicle, a stored vehicle value from the on-device storage of the in-vehicle computing device of the vehicle, a stored assistant value from the assistant storage of the in-vehicle computing device of the vehicle or the another computing device, or a controller value from the CAN bus of the vehicle. However, these values may be inconsistent with one another due to rounding by the given OEM component, truncation of values by the CAN bus, and/or other reasons, such as various software and/or hardware limitations.

In this instance, assume that the given OEM component provides responsive content that indicates a range of the vehicle (e.g., determined from the stored vehicle value from the on-device storage of the in-vehicle computing device of the vehicle or the controller value from the CAN bus of the vehicle) corresponds to a current value of "108 miles". However, assume that the given OEM component, in displaying the range of the vehicle at the display associated with the power source of the vehicle, indicates the display value is "110 miles". In this instance, the display value may be rounded up to the nearest $10^{th}$ mile for simplicity of the user digesting the range information while in the vehicle. Nonetheless, this inconsistency between the automated assistant presenting the current value of "108 miles" to the user and the display value of "110 miles" may create user confusion. As a result, implementations may determine, based on the OEM query, to cause the automated assistant to provide the estimated current value of "110 miles" as the range of the vehicle and in lieu of the current value of "108" miles, thereby mitigating and/or eliminating instances of these inconsistencies. Put another way, since these values, that are included in the responsive content that is provided by the given OEM component responsive to the OEM query, do not match, the automated assistant may simply provide the display value of "110 miles" for presentation to the user responsive to the user providing the given vehicular request, and in lieu of the actual value of "108 miles" to enforce consistency between the display and what is provided for audible presentation to the user responsive to the given vehicular request. Additionally, or alternatively, in this instance, the given OEM query may only obtain the current value of the vehicular device from the OEM component, and the automated assistant may utilize the API to issue a display query to the display associated with the display component to obtain the estimated current value.

Although the above techniques are described with respect to particular vehicular commands (e.g., to alter the state of the blower of the vehicle) and particular vehicle requests (e.g., to obtain the current range of the vehicle), it should be understood that is for the sake of example and is not meant to be limiting. For instance, the techniques described herein may be utilized in processing any vehicular command and/or any vehicular request, related to, but not limited to, temperature values and units (e.g., Fahrenheit, Celsius, Kelvin, etc.), range values and units (e.g., miles, kilometers, etc.), power source values and units (e.g., liters, gallons, watt-hours, etc.), tire pressure values and units (e.g., Pascal, PSI, etc.), and speed values and units (e.g., miles per hour, kilometers per hour, etc.).

Further, although the above techniques are described with respect to primarily enforcing consistency of the value(s), it should be understood that techniques described herein may be similarly applied to enforce consistency of unit(s). For instance, assume that the user located in the vehicle directs a given spoken utterance of "set the temperature to 22 degrees Celsius" to the automated assistant to alter the state of the blower of the vehicle. Further assume that the display component of the display associated with the blower does not support displaying the temperature in Celsius. In this instance, techniques described above may be utilized to alert the user of an alternative vehicular command to set the blower to the same temperature, but in terms of Fahrenheit instead of Celsius. In other instances, techniques may execute the alternative vehicular command, in lieu of the given vehicular command, and alert the user of the alternative vehicular command to set the blower to the same temperature in terms of Fahrenheit.

By using the techniques described herein, various technical advantages can be achieved. As one non-limiting example, techniques described herein enable a system to enforce consistency between these value(s) and/or these unit(s) that are provided for presentation to the user, via a display of the vehicle and/or via the automated assistant, and that are acted upon by the automated assistant and/or the in-vehicle computing device. Accordingly, techniques described herein mitigate and/or eliminate user confusion and user frustration in processing vehicular commands and/or vehicular requests. As a result, a quantity of instances re-engaging in a dialog with the automated assistant may be reduced, thereby reducing a quantity of computational resources consumed in a vehicular environment.

As another non-limiting example, techniques described herein enable a system to enforce consistency between these value(s) and/or these unit(s) that are provided for presentation to the user, via a display of the vehicle and/or via the automated assistant, in a robust and scalable manner. For instance, rather than maintaining a database of different conversion tables or different conversion formulas utilized by different OEMs, an API may be utilized to obtain responsive content from different OEM components of different vehicles. As a result, the techniques described herein are robust to changes of these different conversion tables or different conversion formulas utilized by different OEMs (e.g., which may change over time without notifying the automated assistant), and are scalable to different vehicles manufactured by different OEMs (e.g., which are newly manufactured each year).

The above description is provided as an overview of only some implementations disclosed herein. Those implementations, and other implementations, are described in additional detail herein.

DETAILED DESCRIPTION OF THE DRAWINGS

Figure 1:
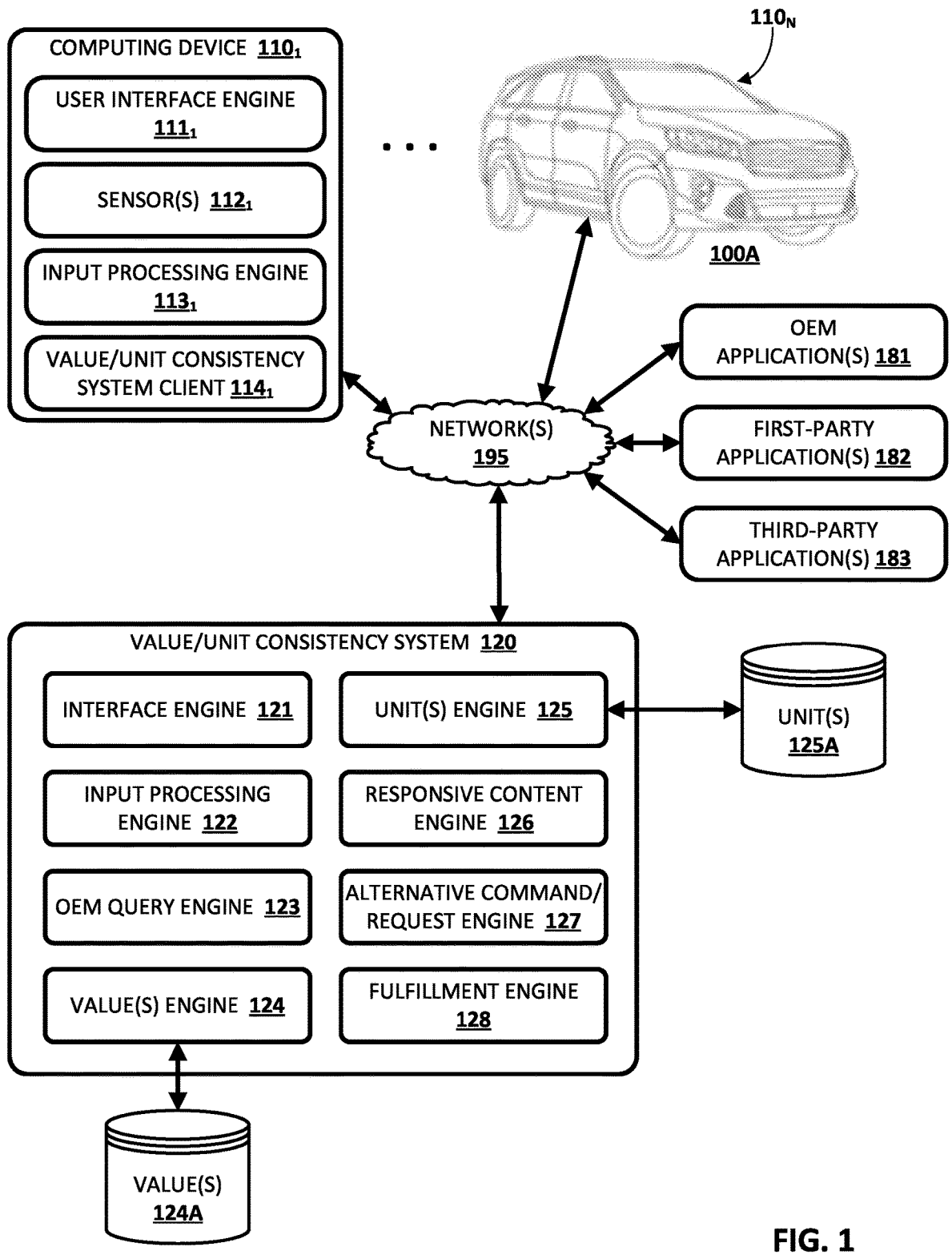
FIG. 1 depicts a block diagram of an example hardware and software environment that demonstrates various aspects of the present disclosure, and in which implementations disclosed herein can be implemented.

Turning now to FIG. 1, an environment in which one or more selected aspects of the present disclosure may be implemented is depicted. The example environment includes a plurality of computing devices $110_{1-N}$, a value/unit consistency system 120, a vehicle 100A, one or more original equipment manufacturer (OEM) applications 181, one or more first-party applications 182, and one or more third-party applications 183. Each of these components $110_{1-N}$, 120, 181, 182, and 183 may communicate, for example, through one or more networks indicated generally by 195. The one or more networks can include wired or wireless networks, such as local area networks (LANs) including Wi-Fi, Bluetooth, near-field communication, and/or other LANs, wide area networks (WANs) including the internet, and/or any other network to facilitate communication between the components depicted in FIG. 1.

In various implementations, a user may operate one or more of the computing devices $110_{1-N}$ to interact with other components depicted in FIG. 1. The computing devices $110_{1-N}$ may be, for example, a desktop computing device, a laptop computing device, a tablet computing device, a mobile phone computing device, a standalone speaker device optionally having a display, an in-vehicle computing device of the vehicle 100A (e.g., an in-vehicle communications system, an in-vehicle entertainment system, and/or an in-vehicle navigation system as shown with respect to $110_N$), or a wearable apparatus that includes a computing device, such as a head-mounted display ("HMD") that provides an augmented reality ("AR") or virtual reality ("VR") immersive computing experience, a "smart" watch, and so forth. Additional and/or alternative computing devices may be provided.

Each of the computing devices $110_{1-N}$ and the value/unit consistency system 120 may include one or more memories for storage of data and software applications (e.g., one or more of the OEM applications 181, one or more of the first-party applications 182, and/or one or more of the third-party applications 183), one or more processors for accessing data and executing the software applications, and other components that facilitate communication over one or more of the networks 195. The operations performed by one or more of the computing devices $110_{1-N}$ and/or the value/unit consistency system 120 may be distributed across multiple computer systems. For example, the value/unit consistency system 120 may be implemented as, for example, computer programs running exclusively on or distributed across one or more computers in one or more locations that are communicatively coupled to each other over one or more of the networks 195. Additionally, or alternatively, the operations performed by one or more of the computing devices $110_{1-N}$ and/or the value/unit consistency system 120 may be executed locally at a computing system. For example, the value/unit consistency system 120 (or an instance thereof) may be implemented locally at each of the computing devices $110_{1-N}$, including locally at an in-vehicle computing device of the vehicle 100A.

One or more of the components $110_{1-N}$, 120, 181, 182, and 183 may include a variety of different components that may be used, for instance, to enforce consistency of value(s) and/or unit(s) in executing vehicular commands and/or in responding to vehicular requests. For example, a computing device $110_1$ may include user interface engine $111_1$ to detect and process user input (e.g., spoken utterances, typed input, and/or touch input) directed to the computing device $110_1$. As another example, the computing device $110_1$ may include one or more sensors $112_1$ to generate corresponding sensor data. The one or more sensors can include, for example, global positioning system ("GPS") sensors to generate GPS data, vision components to generate vision data in a field of view of the vision components, microphones to generate audio data based on spoken utterances captured in an environment of the computing device $110_1$, and/or other sensors to generate corresponding sensor data.

As yet another example, the computing device $110_1$ may operate an input processing engine $113_1$ (e.g., which may be standalone or part of another application, such as part of an automated assistant application) to process various user inputs received at the computing device $110_1$. For example, the input processing engine $113_1$ can cause audio data that captures a spoken utterance and that is generated by microphone(s) of the client device $110_1$ to be processed using automatic speech recognition (ASR) model(s) (e.g., a recurrent neural network (RNN) model, a transformer model, and/or any other ML model capable of performing ASR) to generate ASR output. Further, the input processing engine $113_1$ can cause the ASR output (or typed input) to be processed using natural language understanding (NLU) model(s) (e.g., a long short-term memory (LSTM), gated recurrent unit (GRU), and/or any other type of RNN or other ML model capable of performing NLU) and/or grammar-based NLU rule(s) to generate NLU output. Moreover, the input processing engine $113_1$ can cause at least the NLU output to be processed using fulfillment action model(s) and/or fulfillment rule(s) (e.g., personalized mapping(s)) to obtain one or more candidate responses that are responsive to the user input, such as action(s) to be performed by the automated assistant based on the user input, content item(s) to be provided for presentation to the user based on the user input, etc. In implementations where textual content is to be audibly rendered responsive to the spoken utterance or typed input, the user interface engine $111_1$ can cause the textual content to be processed using text-to-speech (TTS) model(s) to generate synthesized speech audio data that includes computer-generated synthesized speech capturing the textual content. The synthesized speech audio data can be audibly rendered for presentation to the user via speaker(s) of the computing device $110_1$. In implementations where visual content is to be visually rendered responsive to the spoken utterance or typed input, the user interface engine $111_1$ can cause the visual content to be to be visually rendered for presentation to the user via one or more displays that are controllable by the computing device $110_1$.

In various implementations, the ASR output can include, for example, one or more speech hypotheses (e.g., term hypotheses and/or transcription hypotheses) that are predicted to correspond to the voice activity and/or the spoken utterance of the user captured in the audio data, one or more corresponding predicted values (e.g., probabilities, log likelihoods, and/or other values) for each of the one or more speech hypotheses, a plurality of phonemes that are predicted to correspond to the voice activity and/or the spoken utterance of the user captured in the audio data, and/or other ASR output. In some versions of those implementations, the input processing engine $113_1$ can cause one or more of speech hypotheses to be selected as recognized text that corresponds to the spoken utterance (e.g., based on the corresponding predicted values).

In various implementations, the NLU output can include, for example, annotated recognized text that includes one or more annotations of the recognized text for one or more (e.g., all) of the terms of the recognized text. For example, the input processing engine $113_1$ can cause a part of speech tagger (not depicted) to annotate terms with their grammatical roles. Additionally, or alternatively, the input processing engine $113_1$ can cause an entity tagger (not depicted) to annotate entity references in one or more segments of the recognized text. The entity references can include, for instance, references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

Additionally, or alternatively, the input processing engine $113_1$ can cause a coreference resolver (not depicted) to group, or "cluster," references to the same entity based on one or more contextual cues. As one non-limiting example, the coreference resolver may be utilized to resolve the term "that" to a particular light or indicator associated with operation of the vehicle 100A in the natural language input "what's that light?", based on a corresponding sensor data instance generated by vehicle sensor(s) that resulted in the particular light or indicator associated with operation of the vehicle 100A being generated. In some implementations, one or more components utilized by the input processing engine $113_1$ may rely on annotations from one or more other components utilized by the input processing engine $113_1$. For example, in some implementations the entity tagger may rely on annotations from the coreference resolver in annotating one or more mentions of a particular entity. Also, for example, in some implementations, the coreference resolver may rely on annotations from the entity tagger in clustering references to the same entity.

As yet another example, the computing device $110_1$ may operate a value/unit consistency system client $114_1$ (e.g., which may be standalone or part of another application, such as part of an automated assistant application) to host the value/unit consistency system 120 when implemented locally at the computing device $110_1$ and/or to interact with the value/unit consistency system 120 when implemented remotely from the computing device $110_1$. Further, an additional computing device $110_N$ may take the form of an in-vehicle computing device of the vehicle 100A. Although not depicted, the additional computing device $110_N$ may include the same or similar components as the computing device $110_1$.

For example, the additional computing device $110_N$ may include respective instances of a user interface engine to detect and process user input, one or more sensors to generate corresponding vehicle sensor data instances of vehicle sensor data, an input processing engine, and/or a value/unit consistency system client. In this example, the one or more sensors can include vehicle sensors, such as tire pressure sensors to generate tire pressure data for tires of the vehicle 100A, airflow sensors to generate airflow data for an air conditioning system of the vehicle 100A, vehicle speed sensors to generate vehicle speed data for the vehicle 100A, energy sensors to generate energy source data for an energy source of the vehicle 100A, transmission sensors to generate transmission data for a transmission of the vehicle 100A, temperature sensors to generate temperature data indicative of a temperature inside the vehicle 100A and/or outside the vehicle 100A, and/or any other sensors that are integral to the vehicle 100A and/or the in-vehicle computing device $110_N$ of the vehicle 100A. Moreover, although only the computing device $110_1$ and the in-vehicle computing device $110_N$ are depicted in FIG. 1, it should be understood that is for the sake of example and additional or alternative computing devices may be provided (e.g., as described with respect to FIGS. 6A and 6B).

In various implementations, the value/unit consistency system 120 may include interface engine 121, input processing engine 122, OEM query engine 123, value(s) engine 124, unit(s) engine 125, responsive content engine 126, alternative command/request engine 127, and fulfillment engine 128 as shown in FIG. 1. In some implementations, one or more of the engines 121-128 of the fulfillment system 120 may be omitted. In some implementations, all or aspects of one or more of the engines 121-128 of the fulfillment system 120 may be combined. In some implementations, one or more of the engines 121-128 of the fulfillment system 120 may be implemented in a component that is executed, in part or exclusively, remotely from one or more of the computing devices $110_{1-N}$. In some implementations, one or more of the engines 121-128 of the value/unit consistency system 120, or any operative portion thereof, may be implemented in a component that is executed, in part or exclusively, locally by one or more of the computing devices $110_{1-N}$. The various engines of FIG. 1 are described in more detail herein (e.g., with respect to FIGS. 2 and 3).

Figure 2:
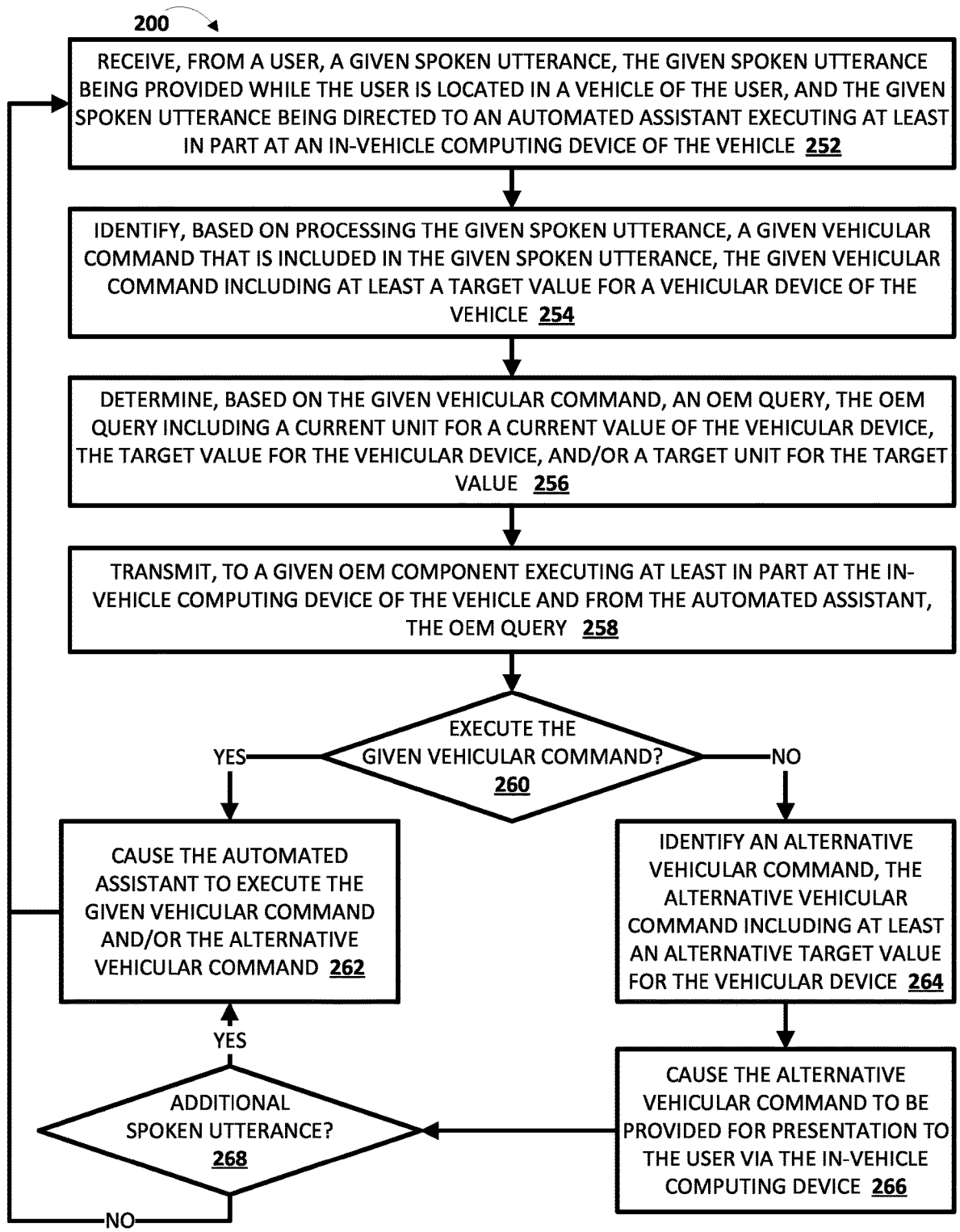
FIG. 2 depicts a flowchart illustrating an example method of enforcing consistency of values and units in a vehicular environment and in response to receiving a vehicular command, in accordance with various implementations.

Turning now to FIG. 2, a flowchart illustrating an example method 200 of enforcing consistency of values and units in a vehicular environment and in response to receiving a vehicular command is depicted. For convenience, the operations of the method 200 are described with reference to a system that performs the operations. This system of the method 200 includes at least one processor, at least one memory, and/or other component(s) of computing device(s) (e.g., computing device(s) $110_{1-N}$ of FIG. 1, value/unit consistency system 120 of FIG. 1, computing device 410 of FIG. 4, remote server(s), and/or other computing devices). While operations of the method 200 are shown in a particular order, this is not meant to be limiting. One or more operations may be reordered, omitted, and/or added.

At block 252, the system receives, from a user, a given spoken utterance, the given spoken utterance being provided while the user is located in a vehicle of the user, and the given spoken utterance being directed to an automated assistant executing at least in part at an in-vehicle computing device of the vehicle. In some implementations, the spoken utterance may be received in response to an automated assistant being explicitly invoked at the computing device via a particular word or phrase (e.g., "Assistant", "Hey Assistant", etc.), actuation of a hardware button or software button of the computing device, a particular gesture or combination of gestures (e.g., hand movement, eye movement, gaze, and/or any one of or combination thereof), and/or other techniques for explicitly invoking the automated assistant. In additional or alternative implementations, the spoken utterance may be received in response to the automated assistant being implicitly invoked at the computing device based on, for instance, one or more contextual signals associated with the user and/or the vehicle of the user. The given spoken utterance may be captured in audio data generated by one or more microphones of an in-vehicle computing device of the vehicle, and passed to the value/unit consistency system 120 via the interface engine 121.

At block 254, the system identifies, based on processing the given spoken utterance, a given vehicular command that is included in the given spoken utterance, the given vehicular command including at least a target value for a vehicular device of the vehicle. For example, the system may cause the input processing engine 122 to process, using an automatic speech recognition (ASR) model, audio data capturing the given spoken utterance to generate ASR output. Further, the system may cause the input processing engine 122 to process, using a natural language understanding (NLU) model, the ASR output to generate NLU output. In this example, the system may identify the given vehicular command, including the target value for the vehicular device of the vehicle based on the ASR output and/or the NLU output.

At block 256, the system determines, based on the given vehicular command, an original equipment manufacturer (OEM) query, the OEM query including a current unit for a current value of the vehicular device, the target value for the vehicular device, and/or a target unit for the target value. For example, the system may cause the OEM query engine 123 to determine the OEM query. In this example, the value(s) engine 124 may identify the current value for the vehicular device from various data sources associated with the vehicle (e.g., value(s) database 124A). Further, the unit(s) engine 125 may identify the current unit for the current value and the target unit for the target value from various data sources associated with the vehicle (e.g., unit(s) database 125A). Although these various sources of data are illustrated in FIG. 1 as dedicated databases of the value/unit consistency system 120, it should be understood that is for the sake of clarity and is not meant to be limiting. Rather, it should be understood that these value(s) and/or unit(s) may be obtained from, for example, a display value and/or a display unit from a display associated with the vehicular device, a stored vehicle value and/or a stored vehicle unit from on-device storage of an in-vehicle computing device of the vehicle, a stored assistant value and/or a stored assistant unit from assistant storage of the in-vehicle computing device of the vehicle or another computing device, and/or a controller value and/or a controller unit from a controller area network (CAN) bus of the vehicle.

In some implementations, the OEM query described herein may be the same regardless of the OEM. For example, an OEM query may have the same structure, format, syntax, etc. for an OEM component of a first vehicle manufactured by a first OEM, an OEM component of a second vehicle manufactured by a second OEM, and so on. In additional or alternative implementations, the OEM query described herein may vary across different OEMs. For example, an OEM query may have first structure, a first format, a first syntax, etc. for an OEM component of a first vehicle manufactured by a first OEM, whereas an OEM query may have second structure, a second format, a second syntax, etc. for an OEM component of a second vehicle manufactured by a second OEM.

At block 258, the system transmits, to a given OEM component executing at least in part at the in-vehicle computing device of the vehicle and from the automated assistant, the OEM query. At block 260, the system determines, based on responsive content received from the given OEM component and that is responsive to the OEM query, whether the automated assistant should execute the given vehicular command. The system, in transmitting the OEM query to the given OEM component via an API, may cause the one or more OEM applications 181 of FIG. 1 to generate responsive content that indicates how the given OEM component would handle the given vehicular command as represented by the OEM query. Further, the system may cause the responsive content engine 126 to process the responsive content to determine whether the automated assistant should execute the given vehicular command. For example, the responsive content may include an expected value for the vehicular device and/or an expected unit for the expected value that is generated by the given OEM component based on the transmitting of the OEM query. The responsive content engine 126 may compare the expected value and/or the expected unit for the expected value included in the responsive content to the target value included in the given spoken utterance and/or the target unit for the target value. Additionally, or alternatively, the responsive content engine 126 may compare the target value included in the given spoken utterance and/or the target unit for the target value to a display value and/or display unit of a display associated with the vehicular device.

If, at an iteration of block 260, the system determines that the automated assistant should execute the given vehicular command, then the system proceeds to block 262. For example, the system may determine that the automated assistant should execute the given vehicular command in response to determining that the expected value matches the target value based on the comparing via the responsive content engine 126 and/or in response to determining that the expected unit for the expected value matches the target unit for the target value based on the comparing via the responsive content engine 126. As used herein, value(s) may be considered to "match" if they exactly match (e.g., "71.00 degrees" and "71.00 degrees") or are within a particular threshold (e.g., +/−1%, +/−0.25, etc.). Further, unit(s) may be considered to "match" if they are associated with the same reference (e.g., Fahrenheit and Fahrenheit, miles and miles, etc.). Additionally, or alternatively, the system may determine that the automated assistant should execute the given vehicular command based on the target value being capable of being displayed at the display associated with the vehicular device based on the comparing via the responsive content engine 126.

In these implementations, at block 262, the system causes the automated assistant to execute the given vehicular command. For example, the system may cause the fulfillment engine 128 to instruct the automated assistant to execute the given vehicular command. In these examples, the system may cause the fulfillment engine 128 to instruct the automated assistant to alter a state of the vehicular device from a current state to an updated state that is based on the target value for the vehicular device. In some implementations, the system may provide, for presentation to the user, an indication of the given vehicular command executed by the automated assistant to be provided for audible presentation to the user via speaker(s) of the vehicle and/or for visual presentation to the user via a display of the vehicle. The system may return to block 252 and perform a subsequent iteration of the method 200 based on receiving an additional spoken utterance from the user that includes an additional vehicular command.

If, at an iteration of block 260, the system determines that the automated assistant should not execute the given vehicular command, then the system proceeds to block 264. For example, the system may determine that the automated assistant should refrain from executing the given vehicular command in response to determining that the expected value does not match the target value based on the comparing via the responsive content engine 126 and/or in response to determining that the expected unit for the expected value does not match the target unit for the target value based on the comparing via the responsive content engine 126. Additionally, or alternatively, the system may determine that the automated assistant should refrain from executing the given vehicular command based on the target value not being capable of being displayed at the display associated with the vehicular device based on the comparing via the responsive content engine 126.

At block 264, the system identifies an alternative vehicular command, the alternative vehicular command including at least an alternative target value for the vehicular device. The alternative vehicular command may additionally, or alternatively, include an alternative target unit for the vehicular device. For example, the system may cause the alternative command/request engine 127 to identify the alternative vehicular command from the responsive content provided back to the system via the API. In these examples, the alternative target value may be included in the responsive content to enforce consistency between the display associated with the given vehicular component and the given vehicular command.

At block 266, the system causes the alternative vehicular command to be provided for presentation to the user via the in-vehicle computing device. For example, the system may cause the interface engine 121 to generate and render audible content that includes an indication of the alternative vehicular command via speaker(s) of the vehicle and/or visual content that includes an indication of the alternative vehicular command via a display of the vehicle. Additionally, or alternatively, the system may execute the alternative vehicular command, in lieu of the given vehicular command, and alert the user of the alternative vehicular command to set the blower to the same temperature in terms of Fahrenheit at block 266. In these instances, the system may return to block 252 and perform a subsequent iteration of the method 200 based on receiving an additional spoken utterance from the user.

At block 268, the system determines whether an additional spoken utterance that corresponds to a user selection of the alternative vehicular command is received. For example, the system may cause the input processing engine 122 to process (e.g., using the ASR model, the NLU model, etc.) additional audio data capturing the additional spoken utterance to determine whether the user selection of the alternative vehicular command is received. If, at an iteration of block 268, the system determines that no additional spoken utterance that corresponds to the user selection of the alternative vehicular command is received, then the system continues monitoring for the additional spoken utterance at block 268 for a threshold duration of time (e.g., 5 seconds, 10 seconds, 30 seconds, etc.) before returning to block 252 to perform a subsequent iteration of the method 200 based on receiving an additional spoken utterance from the user. If, at an iteration of block 268, the system determines that the additional spoken utterance that corresponds to the user selection of the alternative vehicular command is received, then the system proceeds to block 262.

In these implementations, at block 262, the system causes the automated assistant to execute the alternative vehicular command. For example, the system may cause the fulfillment engine 128 to instruct the automated assistant to execute the alternative vehicular command. In these examples, the system may cause the fulfillment engine 128 to instruct the automated assistant to alter a state of the vehicular device from a current state to an updated state that is based on the alternative target value for the vehicular device. In some implementations, the system may provide, for presentation to the user, an indication of the alternative vehicular command executed by the automated assistant to be provided for audible presentation to the user via speaker(s) of the vehicle and/or for visual presentation to the user via a display of the vehicle. The system may return to block 252 and perform a subsequent iteration of the method 200 based on receiving an additional spoken utterance from the user.

Figure 3:
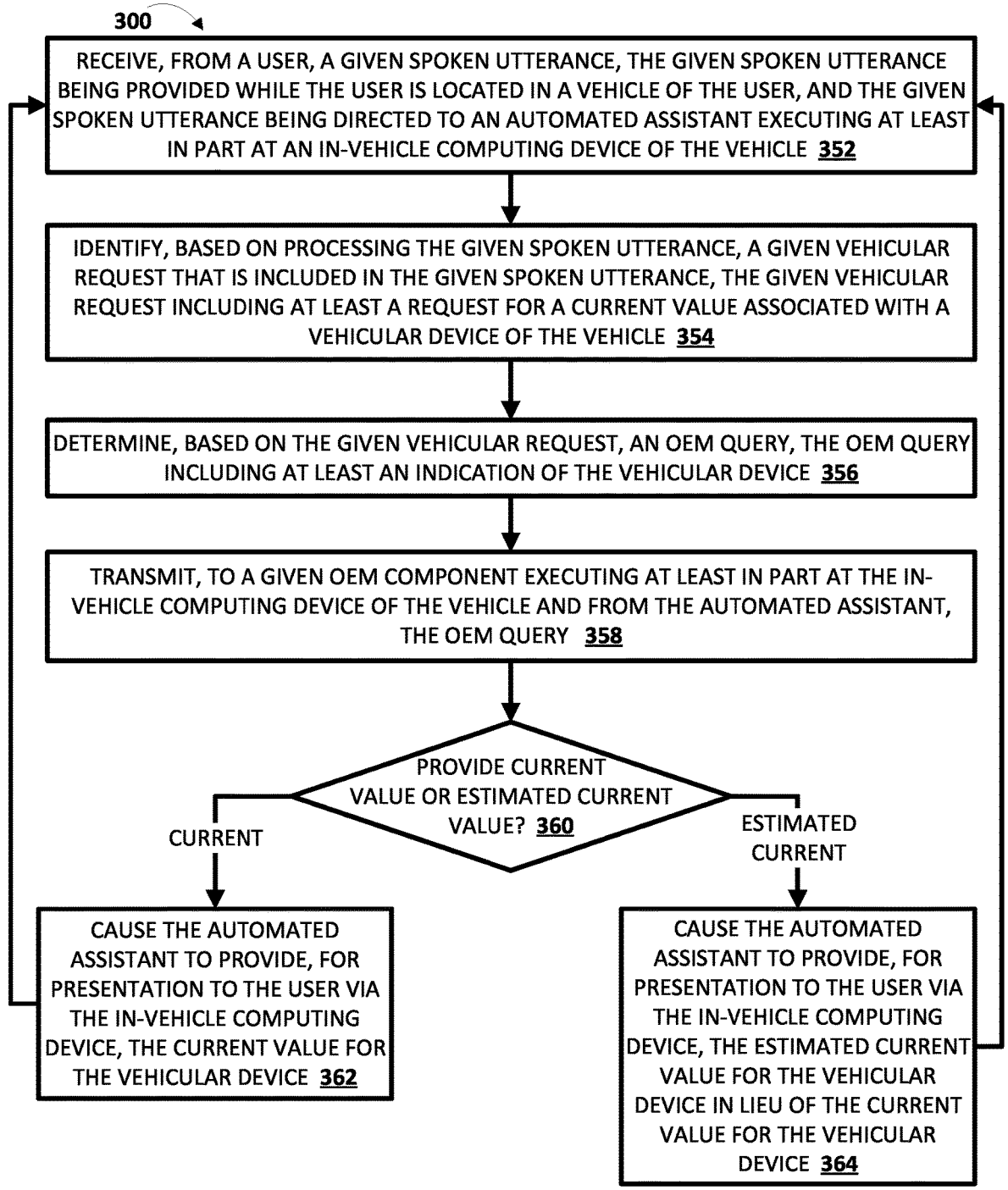
FIG. 3 depicts a flowchart illustrating an example method of enforcing consistency of values and units in a vehicular environment and in response to receiving a vehicular request, in accordance with various implementations.

Turning now to FIG. 3, a flowchart illustrating an example method 300 of enforcing consistency of values and units in a vehicular environment and in response to receiving a vehicular request is depicted. For convenience, the operations of the method 300 are described with reference to a system that performs the operations. This system of the method 300 includes at least one processor, at least one memory, and/or other component(s) of computing device(s) (e.g., computing device(s) $110_{1-N}$ of FIG. 1, value/unit consistency system 120 of FIG. 1, computing device 410 of FIG. 4, remote server(s), and/or other computing devices). While operations of the method 300 are shown in a particular order, this is not meant to be limiting. One or more operations may be reordered, omitted, and/or added.

At block 352, the system receives, from a user, a given spoken utterance, the given spoken utterance being provided while the user is located in a vehicle of the user, and the given spoken utterance being directed to an automated assistant executing at least in part at an in-vehicle computing device of the vehicle. In some implementations, the spoken utterance may be received in response to an automated assistant being explicitly invoked at the computing device via a particular word or phrase (e.g., "Assistant", "Hey Assistant", etc.), actuation of a hardware button or software button of the computing device, a particular gesture or combination of gestures (e.g., hand movement, eye movement, gaze, and/or any one of or combination thereof), and/or other techniques for explicitly invoking the automated assistant. In additional or alternative implementations, the spoken utterance may be received in response to the automated assistant being implicitly invoked at the computing device based on, for instance, one or more contextual signals associated with the user and/or the vehicle of the user. The given spoken utterance may be captured in audio data generated by one or more microphones of an in-vehicle computing device of the vehicle, and passed to the value/unit consistency system 120 via the interface engine 121.

At block 354, the system identifies, based on processing the given spoken utterance, a given vehicular request that is included in the given spoken utterance, the given vehicular request including at least a request for a current value associated with a vehicular device of the vehicle. For example, the system may cause the input processing engine 122 to process, using an automatic speech recognition (ASR) model, audio data capturing the given spoken utterance to generate ASR output. Further, the system may cause the input processing engine 122 to process, using a natural language understanding (NLU) model, the ASR output to generate NLU output. In this example, the system may identify the given vehicular request for the current value associated with the vehicular device of the vehicle based on the ASR output and/or the NLU output.

At block 356, the system determines, based on the given vehicular request, an original equipment manufacturer (OEM) query, the OEM query including an indication of the vehicular device. The OEM query may optionally include a current unit for the current value. For example, the system may cause the OEM query engine 123 to determine the OEM query. In this example, the indication of the vehicular device may be identified based on the processing of the given spoken utterance. Further, the unit(s) engine 125 may identify the current unit for the current value from various data sources associated with the vehicle (e.g., unit(s) database 125A). Although the unit(s) database 125A is illustrated in FIG. 1 as a dedicated database of the value/unit consistency system 120, it should be understood that is for the sake of clarity and is not meant to be limiting. Rather, it should be understood that these value(s) and/or unit(s) may be obtained from, for example, a display unit from a display associated with the vehicular device, a stored vehicle unit from on-device storage of an in-vehicle computing device of the vehicle, a stored assistant unit from assistant storage of the in-vehicle computing device of the vehicle or another computing device, and/or a controller unit from a controller area network (CAN) bus of the vehicle.

At block 358, the system transmits, to a given OEM component executing at least in part at the in-vehicle computing device of the vehicle and from the automated assistant, the OEM query. At block 360, the system determines, based on responsive content received from the given OEM component and that is responsive to the OEM query, whether the automated assistant should provide, for presentation to the user and responsive to the given vehicular request, the current value for the vehicular device or an estimated current value for the vehicular device and in lieu of the current value for the vehicular device. The system, in transmitting the OEM query to the given OEM component via an API, may cause the one or more OEM applications 181 of FIG. 1 to obtain responsive content that indicates how the given OEM component can respond to the given vehicular request as represented by the OEM query. Further, the system may cause the responsive content engine 126 to process the responsive content to determine whether the automated assistant should provide, for presentation to the user and responsive to the given vehicular request, the current value for the vehicular device or the estimated current value for the vehicular device and in lieu of the current value for the vehicular device. For example, the responsive content may include the current value for the vehicular device and the estimated current value for the vehicular device. In some examples, the system may determine to provide the current value responsive to the given vehicular request in response to determining that the current value matches the estimated current value and based on the comparing via the responsive content engine 126. Otherwise, the system may determine to provide the estimated current value and in lieu of the current value. Notably, the estimated current value in this example may correspond to the display value of the display associated with the vehicular device.

In other examples, the system may determine to provide the current value based on the given vehicular request or a type of the given vehicular request. For example, rather than simply providing a spoken utterance of "what's my range?", assume that the user provides a spoken utterance of "can I reach the airport?". In this example, the system may utilize the responsive content engine 126 to determine to utilize the current value in responding to the request and in lieu of the estimated current value. For instance, assume that the current value is "108 miles" for the range of the vehicle of the user and the estimated current value is "110 miles" based on the OEM of the vehicle rounding up the range for display and based on transmitting the OEM query to the given OEM component, but assume that the airport is 109 miles away. In this instance, and based on the given vehicular request implicitly requesting the range of the vehicle (e.g., whether the range of the vehicle is sufficient to arrive at a destination location), the system may determine to provide the current value over the estimated current value, even in response to determining they do not match. Accordingly, in this example, the system may utilize the current value to correctly determine that the user cannot reach the airport, whereas the system may incorrectly determine that the user can reach the airport based on the estimated current value. As a result, the system may generate output based on the current value, and cause the output generated based on the current value to be provided for presentation to the user via the in-vehicle computing device (e.g., audible output of "you cannot make it to the airport based on your current range").

If, at an iteration of block 360, the system determines that the automated assistant should provide the current value for the vehicular device for presentation to the user and responsive to the given vehicular request, then the system proceeds to block 362. At block 362, the system causes the automated assistant to provide, for presentation to the user via the in-vehicle computing device, the current value for the vehicular device. For example, the system may cause the fulfillment engine 128 to instruct the automated assistant to provide, for presentation to the user, the current value for audible presentation to the user via speaker(s) of the vehicle and/or for visual presentation to the user via a display of the vehicle. The system may return to block 352 and perform a subsequent iteration of the method 300 based on receiving an additional spoken utterance from the user that includes an additional vehicular request.

If, at an iteration of block 360, the system determines that the automated assistant should provide the estimated current value for the vehicular device for presentation to the user and responsive to the given vehicular request, then the system proceeds to block 364. At block 364, the system causes the automated assistant to provide, for presentation to the user via the in-vehicle computing device, the estimated current value for the vehicular device. For example, the system may cause the fulfillment engine 128 to instruct the automated assistant to provide, for presentation to the user, the estimated current value for audible presentation to the user via speaker(s) of the vehicle and/or for visual presentation to the user via a display of the vehicle. The system may return to block 352 and perform a subsequent iteration of the method 300 based on receiving an additional spoken utterance from the user that includes an additional vehicular request.

Figure 4:
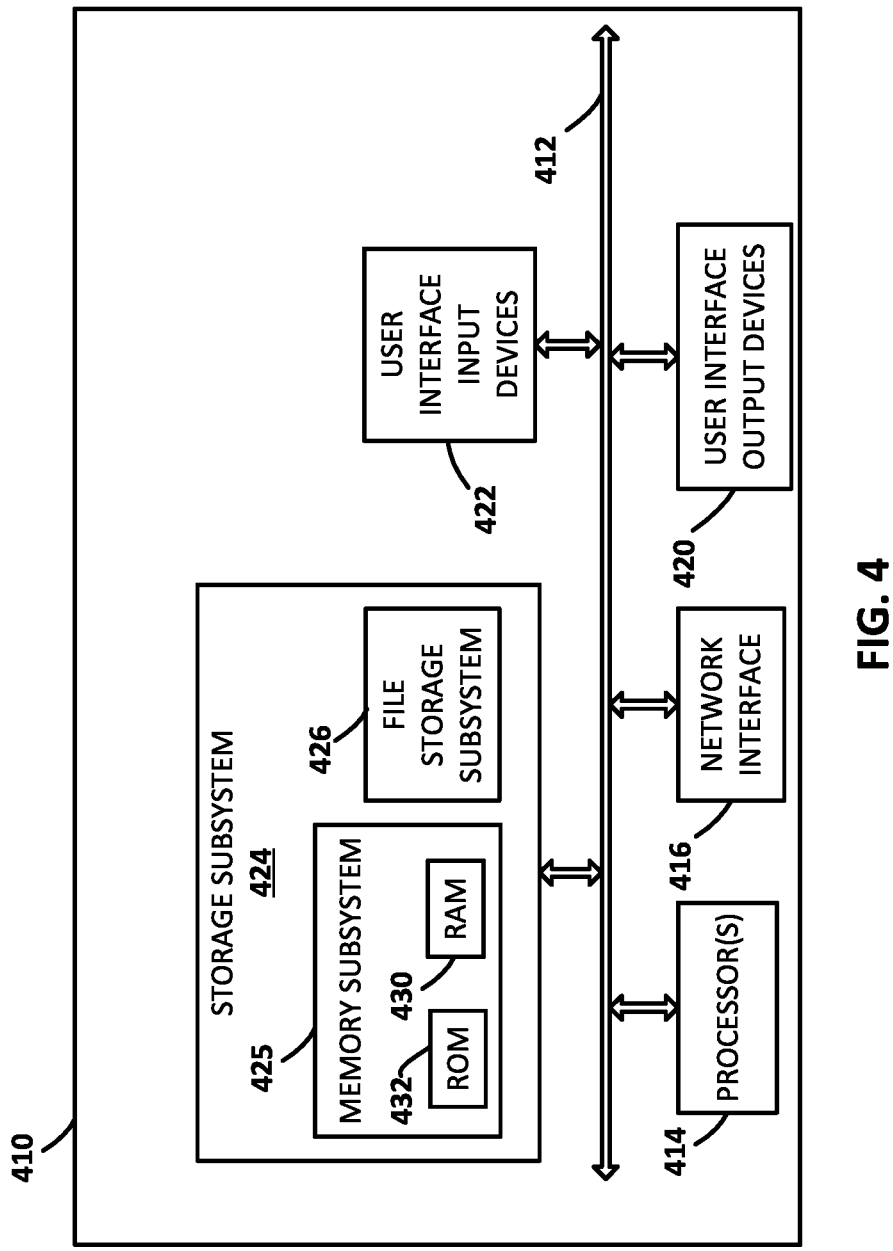
FIG. 4 depicts an example architecture of a computing device, in accordance with various implementations.

Turning now to FIG. 4, a block diagram of an example computing device 410 that may optionally be utilized to perform one or more aspects of techniques described herein is depicted. In some implementations, one or more computing devices, one or more vehicles, and/or other component(s) may comprise one or more components of the example computing device 410.

Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of the methods disclosed herein, as well as to implement various components depicted in FIG. 1.

These software modules are generally executed by processor 414 alone or in combination with other processors. Memory 425 used in the storage subsystem 424 can include a number of memories including a main random-access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem 412 may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving, from a user, a given spoken utterance, the given spoken utterance being provided while the user is located in a vehicle of the user, and the given spoken utterance being directed to an automated assistant executing at least in part at an in-vehicle computing device of the vehicle; identifying, based on processing the given spoken utterance, a given vehicular command that is included in the given spoken utterance, the given vehicular command including at least a target value for a vehicular device of the vehicle; determining, based on the given vehicular command, an original equipment manufacturer (OEM) query, the OEM query including a current unit for a current value of the vehicular device, the target value for the vehicular device, and/or a target unit for the target value; transmitting, to a given OEM component executing at least in part at the in-vehicle computing device of the vehicle and from the automated assistant, the OEM query; determining, based on responsive content received from the given OEM component that is responsive to the OEM query, whether the automated assistant should execute the given vehicular command; and in response to determining that the automated assistant should execute the given vehicular command: causing the automated assistant to execute the given vehicular command.

These and other implementations of technology disclosed herein can optionally include one or more of the following features.

In some implementations, transmitting the OEM query to the given OEM component and from the automated assistant may cause the given OEM component to: determine, based on the OEM query, an expected value for the vehicular device and an expected unit for the expected value; and transmit, to the automated assistant and from the given OEM component, the expected value for the vehicular device and the expected unit for the expected value as the responsive content.

In some versions of those implementations, determining that the automated assistant should execute the given vehicular command may further include determining that the expected value for the vehicular device matches the target value for the vehicular device that was included in the spoken utterance.

In some further versions of those implementations, determining that the automated assistant should execute the given vehicular command further may include determining that the expected unit for the expected value matches the target unit for the target value.

In additional or alternative versions of those implementations, the method may further include, in response to determining that the automated assistant should not execute the given vehicular command: refraining from causing the automated assistant to execute the given vehicular command; identifying, based on the responsive content, an alternative vehicular command, the alternative vehicular command including at least an alternative target value for the vehicular device of the vehicle that differs from the target value that is included in the spoken utterance; and causing the alternative vehicular command to be provided for presentation to the user via the in-vehicle computing device.

In some further versions of those implementations, determining that the automated assistant should not execute the given vehicular command may include determining that the expected value for the vehicular device does not match the target value for the vehicular device that was included in the spoken utterance.

In additional or alternative further versions of those implementations, the alternative target value may include the expected value.

In some implementations, transmitting the OEM query to the given OEM component and from the automated assistant may be via a controller area network (CAN) bus of the vehicle.

In some implementations, causing the automated assistant to execute the given vehicular command may include causing the automated assistant to alter a state of the vehicular device based on the target value for the vehicular device.

In some implementations, the target unit for the target value may be included in the given vehicular command.

In some implementations, the target unit for the target value may be inferred based on the given vehicular command.

In some implementations, the target unit for the target value may be determined based on a display unit of a display, of the in-vehicle computing device, that is associated with the vehicular device.

In some implementations, the target unit for the target value may differ from the current unit for the current value.

In some implementations, identifying the given vehicular command that is included in the given spoken utterance based on processing the given spoken utterance may include processing, using an automatic speech recognition (ASR) model, audio data that captures the given spoken utterance to generate ASR output; processing, using a natural language understanding (NLU) model, the ASR output to generate NLU output; and identifying, based on the NLU output, the given vehicular command that is included in the given spoken utterance.

In some implementations, a method implemented by one or more processors is provided, and includes receiving, from a user, a given spoken utterance, the given spoken utterance being provided while the user is located in a vehicle of the user, and the given spoken utterance being directed to an automated assistant executing at least in part at an in-vehicle computing device of the vehicle; identifying, based on processing the given spoken utterance, a given vehicular request that is included in the given spoken utterance, the given vehicular request including at least a request for a current value associated with a vehicular device of the vehicle; determining, based on the given vehicular request, an original equipment manufacturer (OEM) query, the OEM query including at least an indication of the vehicular device; transmitting, to a given OEM component executing at least in part at the in-vehicle computing device of the vehicle and from the automated assistant, the OEM query; determining, based on responsive content received from the given OEM component that is responsive to the OEM query, whether the automated assistant should provide, for presentation to the user and responsive to the given vehicular request, the current value for the vehicular device or an estimated current value for the vehicular device and in lieu of the current value for the vehicular device; and in response to determining that the automated assistant should provide the estimated current value for the vehicular device and in lieu of the current value for the vehicular device: causing the automated assistant to provide, for presentation to the user, the estimated current value for the vehicular device via the in-vehicle computing device.

These and other implementations of technology disclosed herein can optionally include one or more of the following features.

In some implementations, transmitting the OEM query to the given OEM component and from the automated assistant may cause the given OEM component to: obtain, based on the OEM query, the current value for the vehicular device from an in-vehicle storage device communicatively coupled to the in-vehicle computing device or directly from the vehicular device; obtain, based on the OEM query, the estimated current value for the vehicular device from a display, of the in-vehicle computing device, that is associated with the vehicular device; and transmit, to the automated assistant and from the given OEM component, the current value for the vehicular device and the estimated current value for the vehicular device as the responsive content.

In some versions of those implementations, determining that the automated assistant should provide the estimated current value for the vehicular device and in lieu of the current value for the vehicular device may include determining that the estimated current value for the vehicular device does not match the current value for the vehicular device.

In some implementations, the method may further include, in response to determining that the automated assistant should provide the current value for the vehicular device and in lieu of the estimated current value for the vehicular device: causing the automated assistant to provide, for presentation to the user, the current value for the vehicular device via the in-vehicle computing device.

In some versions of those implementations, determining that the automated assistant should provide the current value for the vehicular device and in lieu of the estimated current value for the vehicular device may include determining that the current value for the vehicular device matches the estimated current value for the vehicular device.

In some implementations, the method may further include, in response to determining that the automated assistant should provide the current value for the vehicular device and in lieu of the estimated current value for the vehicular device: causing the automated assistant to provide, for presentation to the user, output generated based on the current value for the vehicular device via the in-vehicle computing device.

In some versions of those implementations, determining that the automated assistant should provide the current value for the vehicular device and in lieu of the estimated current value for the vehicular device may include determining that the given vehicular request is a type of given vehicular request that requests the output be inferentially generated based on the current value for the vehicular device.

In some implementations, identifying the given vehicular request that is included in the given spoken utterance based on processing the given spoken utterance may include processing, using an automatic speech recognition (ASR) model, audio data that captures the given spoken utterance to generate ASR output; processing, using a natural language understanding (NLU) model, the ASR output to generate NLU output; and identifying, based on the NLU output, the given vehicular request that is included in the given spoken utterance.

In some implementations, the OEM query may further include a current unit for the current value.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors comprising:
    receiving, from a user, a given spoken utterance, the given spoken utterance being provided while the user is located in a vehicle of the user, and the given spoken utterance being directed to an automated assistant executing at least in part at an in-vehicle computing device of the vehicle;
    identifying, based on processing the given spoken utterance, a given vehicular command that is included in the given spoken utterance, the given vehicular command including at least a target value for a vehicular device of the vehicle;
    determining, based on the given vehicular command, an original equipment manufacturer (OEM) query, the OEM query including a current unit for a current value of the vehicular device, the target value for the vehicular device, and/or a target unit for the target value;
    transmitting, to a given OEM component executing at least in part at the in-vehicle computing device of the vehicle and from the automated assistant, the OEM query;
    determining, based on responsive content received from the given OEM component that is responsive to the OEM query, whether the automated assistant should execute the given vehicular command; and
    in response to determining that the automated assistant should execute the given vehicular command:
        causing the automated assistant to execute the given vehicular command.

2. The method of claim 1, wherein transmitting the OEM query to the given OEM component and from the automated assistant causes the given OEM component to:
    determine, based on the OEM query, an expected value for the vehicular device and an expected unit for the expected value; and
    transmit, to the automated assistant and from the given OEM component, the expected value for the vehicular device and the expected unit for the expected value as the responsive content.

3. The method of claim 2, wherein determining that the automated assistant should execute the given vehicular command comprises:
    determining that the expected value for the vehicular device matches the target value for the vehicular device that was included in the spoken utterance.

4. The method of claim 3, wherein determining that the automated assistant should execute the given vehicular command further comprises:
determining that the expected unit for the expected value matches the target unit for the target value.

5. The method of claim 2, further comprising:
in response to determining that the automated assistant should not execute the given vehicular command:
refraining from causing the automated assistant to execute the given vehicular command;
identifying, based on the responsive content, an alternative vehicular command, the alternative vehicular command including at least an alternative target value for the vehicular device of the vehicle that differs from the target value that is included in the spoken utterance; and
causing the alternative vehicular command to be provided for presentation to the user via the in-vehicle computing device.

6. The method of claim 5, wherein determining that the automated assistant should not execute the given vehicular command comprises:
determining that the expected value for the vehicular device does not match the target value for the vehicular device that was included in the spoken utterance.

7. The method of claim 5, wherein the alternative target value includes the expected value.

8. The method of claim 1, wherein transmitting the OEM query to the given OEM component and from the automated assistant is via a controller area network (CAN) bus of the vehicle.

9. The method of claim 1, wherein causing the automated assistant to execute the given vehicular command comprises:
causing the automated assistant to alter a state of the vehicular device based on the target value for the vehicular device.

10. The method of claim 1, wherein the target unit for the target value is included in the given vehicular command.

11. The method of claim 1, wherein the target unit for the target value is inferred based on the given vehicular command.

12. The method of claim 1, wherein the target unit for the target value is determined based on a display unit of a display, of the in-vehicle computing device, that is associated with the vehicular device.

13. The method of claim 1, wherein the target unit for the target value differs from the current unit for the current value.

14. The method of claim 1, wherein identifying the given vehicular command that is included in the given spoken utterance based on processing the given spoken utterance comprises:
processing, using an automatic speech recognition (ASR) model, audio data that captures the given spoken utterance to generate ASR output;
processing, using a natural language understanding (NLU) model, the ASR output to generate NLU output; and
identifying, based on the NLU output, the given vehicular command that is included in the given spoken utterance.

15. A method implemented by one or more processors, the method comprising:
receiving, from a user, a given spoken utterance, the given spoken utterance being provided while the user is located in a vehicle of the user, and the given spoken utterance being directed to an automated assistant executing at least in part at an in-vehicle computing device of the vehicle;
identifying, based on processing the given spoken utterance, a given vehicular request that is included in the given spoken utterance, the given vehicular request including at least a request for a current value associated with a vehicular device of the vehicle;
determining, based on the given vehicular request, an original equipment manufacturer (OEM) query, the OEM query including at least an indication of the vehicular device;
transmitting, to a given OEM component executing at least in part at the in-vehicle computing device of the vehicle and from the automated assistant, the OEM query;
determining, based on responsive content received from the given OEM component that is responsive to the OEM query, whether the automated assistant should provide, for presentation to the user and responsive to the given vehicular request, the current value for the vehicular device or an estimated current value for the vehicular device and in lieu of the current value for the vehicular device; and
in response to determining that the automated assistant should provide the estimated current value for the vehicular device and in lieu of the current value for the vehicular device:
causing the automated assistant to provide, for presentation to the user, the estimated current value for the vehicular device via the in-vehicle computing device.

16. The method of claim 15, wherein transmitting the OEM query to the given OEM component and from the automated assistant causes the given OEM component to:
obtain, based on the OEM query, the current value for the vehicular device from an in-vehicle storage device communicatively coupled to the in-vehicle computing device or directly from the vehicular device;
obtain, based on the OEM query, the estimated current value for the vehicular device from a display, of the in-vehicle computing device, that is associated with the vehicular device; and
transmit, to the automated assistant and from the given OEM component, the current value for the vehicular device and the estimated current value for the vehicular device as the responsive content.

17. The method of claim 16, wherein determining that the automated assistant should provide the estimated current value for the vehicular device and in lieu of the current value for the vehicular device comprises:
determining that the estimated current value for the vehicular device does not match the current value for the vehicular device.

18. The method of claim 15, further comprising:
in response to determining that the automated assistant should provide the current value for the vehicular device and in lieu of the estimated current value for the vehicular device:
causing the automated assistant to provide, for presentation to the user, output generated based on the current value for the vehicular device via the in-vehicle computing device.

19. The method of claim 18, wherein determining that the automated assistant should provide the current value for the vehicular device and in lieu of the estimated current value for the vehicular device comprises:

determining that the given vehicular request is a type of given vehicular request that requests the output be inferentially generated based on the current value for the vehicular device.

20. An in-vehicle computing device comprising:
at least one processor; and
memory storing instructions that, when executed, cause the at least one processor to perform operations, the operations comprising:
  receiving, from a user, a given spoken utterance, the given spoken utterance being provided while the user is located in a vehicle of the user, and the given spoken utterance being directed to an automated assistant executing at least in part at the in-vehicle computing device of the vehicle;
  identifying, based on processing the given spoken utterance, a given vehicular command that is included in the given spoken utterance, the given vehicular command including at least a target value for a vehicular device of the vehicle;
  determining, based on the given vehicular command, an original equipment manufacturer (OEM) query, the OEM query including a current unit for a current value of the vehicular device, the target value for the vehicular device, and/or a target unit for the target value;
  transmitting, to a given OEM component executing at least in part at the in-vehicle computing device of the vehicle and from the automated assistant, the OEM query;
  determining, based on responsive content received from the given OEM component that is responsive to the OEM query, whether the automated assistant should execute the given vehicular command; and
  in response to determining that the automated assistant should execute the given vehicular command:
    causing the automated assistant to execute the given vehicular command.

* * * * *